United States Patent [19]

Tanaka et al.

[11] Patent Number: 4,507,978

[45] Date of Patent: Apr. 2, 1985

[54] STARTER

[75] Inventors: Toshinori Tanaka; Akira Morishita, both of Hyogo, Japan

[73] Assignee: Mitsubishi Denki Kabushiki Kaisha, Tokyo, Japan

[21] Appl. No.: 435,189

[22] Filed: Oct. 19, 1982

[30] Foreign Application Priority Data

Oct. 30, 1981 [JP] Japan .......................... 56-163437[U]

[51] Int. Cl.[3] ........................ F02N 11/00; F16H 1/28; F16H 3/44

[52] U.S. Cl. ........................................ 74/7 E; 74/801; 74/785

[58] Field of Search ................. 74/7 E, 801, 788, 785; 310/83

[56] References Cited

U.S. PATENT DOCUMENTS

| | | | |
|---|---|---|---|
| 1,039,685 | 10/1912 | Apple | 74/7 E |
| 2,354,884 | 8/1944 | Thornburg | 74/7 E |
| 2,679,170 | 5/1954 | Prittie | 74/785 |
| 2,870,655 | 1/1959 | Rockwell | 74/785 |
| 3,295,394 | 1/1967 | Whateley | 74/785 |
| 3,686,961 | 8/1972 | Campbell | 74/7 R |
| 3,974,719 | 8/1976 | Tiliander | 74/810 |
| 4,440,042 | 4/1984 | Holdeman | 74/785 |

FOREIGN PATENT DOCUMENTS

| | | | |
|---|---|---|---|
| 2441735 | 6/1980 | France . | |
| 2448642 | 9/1980 | France . | |
| 77165 | 5/1983 | Japan | 74/7 E |

*Primary Examiner*—Allan D. Herrmann
*Assistant Examiner*—Stephen B. Andrews
*Attorney, Agent, or Firm*—Sughrue, Mion, Zinn, Macpeak, and Seas

[57] ABSTRACT

An inner deceleration type starter having a planetary gear has a DC motor rotary shaft and an output shaft supported by first and second bearings which overlap along a radial direction of the rotary shaft. In addition, an engaging portion of an overrunning clutch is also disposed in a space outside the first and second bearings so as to overlap the same along the radial direction of the rotary shaft, thus reducing the overall longitudinal length of the starter.

6 Claims, 2 Drawing Figures

STARTER

BACKGROUND OF THE INVENTION

1. Field of the Invention

The present invention relates to an inner deceleration type starter. In particular, the invention relates to an improvement in a starter having a planetary gear deceleration means.

2. Description of the Prior Art

FIG. 1 shows a conventional starter which includes a starter assembly 1, a D.C. motor 2 fitted to a bracket 3, and a ring gear 4 having a planetary gear mechanism fixed at the portion 3*a* of the bracket 3 in such a way as to be clasped together with an intermediate bracket 5 between the bracket 3 and the D.C. motor 2. The D.C. motor 2 also includes an armature 6. An output rotary shaft 7 of the D.C. motor 2 is supported by a sleeve bearing 8 which is fitted to an inner peripheral surface of the above-mentioned intermediate bracket 5, and a spur gear 9 which can be a sun gear, projects from the end of the rotary shaft 7. A planetary gear 10 is supported on a pin 12 which is, in turn, supported by a flange 13 via a bearing 11. The planetary gear 10 engages the ring gear 4 and the spur gear 9 so that the rotational speed of the spur gear 9 is decelerated and transmitted to the flange 13. An output rotary shaft 14 is fitted to the flange 13, and the front end portion of the output rotary shaft 14 is supported by sleeve bearing 16 which is located in a recess 15 which is formed in the inner peripheral end of the output rotary shaft. An overrunning clutch 17 has an outer clutch 18 which is helically spline-coupled to the output rotary shaft 14. A ring 19 is fitted into the outer clutch 18. A recessed groove B is formed between the ring 19 and a shoulder portion A of the outer clutch 18. A shift lever 20 is cam-engaged in the recessed groove B.

The conventional starter just described operates as follows. When the shift lever 20 is energized in such a way as to be moved, the overrunning clutch 17 is energized and moves forward so as to engage an engine (not shown). Then, an electric current is supplied to the armature 6 energizing the armature 6 which causes the rotary shaft 7 to rotate. The planetary gear 10 makes a planetary deceleration rotation within the ring gear 4 by the spur gear 9 which is provided at the forward end portion of the rotary shaft 7, so that the rotation power is transmitted to the flange 13 via the pin 12, thereby effecting the decelerated rotation of the output rotary shaft 14. As a result, the overrunning clutch 17 is energized and rotated via the outer clutch 18 which is spline-coupled to the output rotary shaft 14. Thus, an internal combustion engine (not shown) is started.

In the conventional starter, since the bearings 8 for supporting the rotary shaft 7, and the bearings 16 for supporting the output rotary shaft 14, are located along the longitudinal axial direction of the shafts 7, 14, and the groove B of the overrunning clutch 17 in which the shift lever is engaged is also displaced from these bearings along the longitudinal direction of the shafts 7, 14, the length in the longitudinal axial direction of the shafts 7, 14 is excessively long.

SUMMARY OF THE INVENTION

An object of the present invention is to provide a means for supporting the ends of the output rotary shaft and the armature rotary shaft in a starter which overlap one another as well as overlap the groove in which the shift lever is engaged so that the axial length of the starter can be greatly reduced. Accordingly, the size of the starter is significantly reduced as well as the weight thereof.

DESCRIPTION OF THE PREFERRED EMBODIMENT

Figure 1:
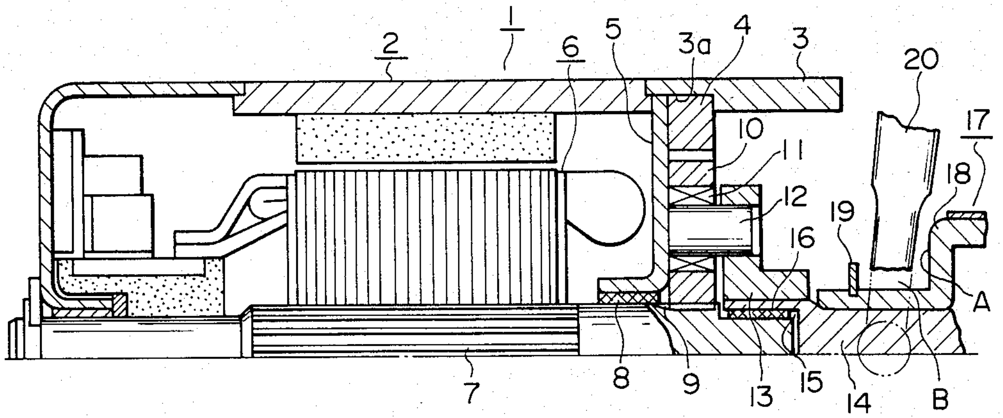
FIG. 1 is a half cross sectional view showing essential parts of a conventional starter.
Figure 2:
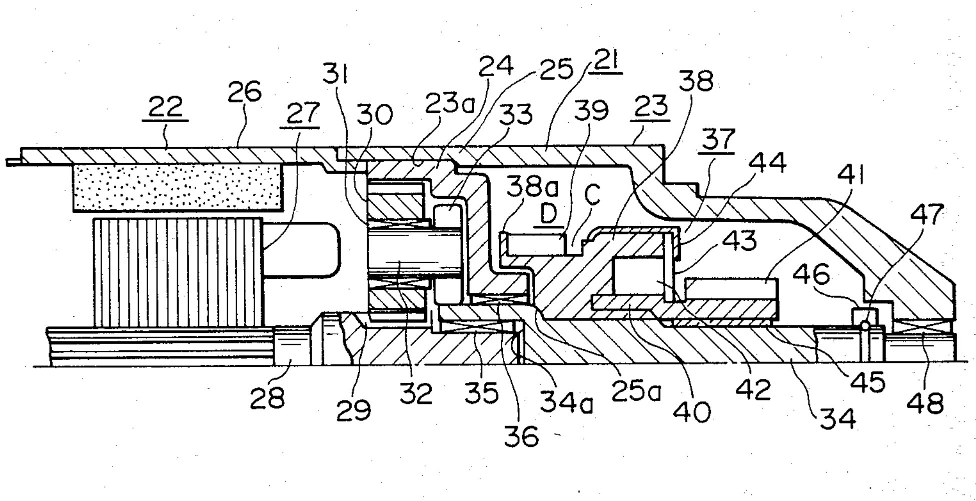
FIG. 2 is a half cross sectional view showing essential parts of an inner deceleration type starter constructed in accordance with one embodiment of the present invention.

Referring to FIG. 2, a D.C. motor 22 having an armature 27 is mounted to a starter motor 21. A ring gear 24 and an intermediate bracket 25 are fitted to an inner portion 23*a* of a front bracket 23 so as to be clasped between the front bracket 23 and a yoke 26 of the D.C. motor 22. A spur gear 29 comprising a sun gear is provided on a rotary shaft 28 of the armature 27. A planetary gear 30 engages the spur gear 29. A bearing 31 is disposed around a support pin 32, and a flange 33 is fixedly mounted onto an output shaft 34. Sleeve bearings 35 and 36 are arranged in a recessed portion 34*a* of the rotary shaft 34 as well as in an inner periphery of a projected portion 25*a* of the intermediate bracket 25 in such a way so that the sleeve bearings 35 and 36 overlap each other along a longitudinal axial direction of the rotary shafts 28 and 34. The sleeve bearings 35 and 36 support the rotary shafts 28 and 34 respectively. An overrunning clutch 37 includes an outer clutch 38 which projects from and is helically spline-coupled to the output rotary shaft 34 in such a way as to be able to slide forward on the shaft 34. A projection ring 38*a* is provided on the outer clutch 38 and forms a groove C in which a shift lever 39 is engaged. The projection ring 38*a* is arranged in such a way as to overlap the projected portion 25*a* of the intermediate bracket 25 in the direction of the diameter thereof. An inner clutch 40 integrally fixes a pinion 41. The rotation power of the outer clutch 38 is unidirectionally coupled by a roller 42. A washer 43 and a cover 44 are caulked so as to be fixedly mounted on the outer clutch 38 so that the structural members described above are integrally assembled together as shown in FIG. 2. A sleeve bearing 45 is fitted to the inner peripheral surface of the inner clutch 40. The sleeve bearing 45 is slidable on the output rotary shaft 34 in such a way as to be able to effect a swinging motion thereon. A stopper 46 is fitted on the rotary shaft 34 via a ring 47. When the overrunning clutch 37 is projected, the stopper 46 comes in contact with the pinion 41 creating pressure therebetween. The pressure imparted to the stopper 46 is transmitted to the output rotary shaft 34 via the ring 47. A sleeve bearing 48 is fitted to the inner peripheral surface of the front end of the front bracket 23, and the sleeve bearing 48 supports the front end portion of the output rotary shaft 34.

The starter described above operates as follows. The shift lever 39 is energized and moved in the direction indicated by an arrow D by the energization function of an electromagnetic switch (now shown) which energizes the overrunning clutch 37 and causes the overrunning clutch to move forward. Then, the pinion 41 engages a ring gear (not shown) of an engine which is not shown. At the time of this engagement, a main electric current is supplied to the armature 27, so that the rotary shaft 28 is energized and caused to rotate. This causes the planetary gear 30 to be driven via the spur gear 29 so that the flange 33 is rotated by the pin 32. This rotation power is transmitted to the rotary shaft 34 and to the pinion 41 via the outer clutch 38 of the overrunning clutch 37, the roller 42 and the inner clutch 40, so that the above-mentioned internal combustion engine (now shown) is started. After the engine is started, the pinion 41 is reversely energized by the internal combustion engine, however a no-load running is effected due to the unidirectional rotary engaging function of the overrunning clutch 37. After the engine is started, as mentioned above, the shift lever 39 moves back and the pinion 41 is detached from the ring gear of the engine, so as to be returned to the state, as shown in FIG. 2, and thereafter remains stationary.

In accordance with the embodiment just described, since the sleeve bearings 35 and 36 for supporting the shafts 28 and 34 overlap one another in addition to overlapping the engaging portion of the shift lever 39 in three stages in the radial direction of the rotary shafts respectively, the length in the longitudinal direction of the shafts 28 and 34 is significantly reduced.

Although the embodiment just described employs the D.C. motor as the prime mover, similar advantages are obtained even if fluid energy is employed as the prime mover.

What is claimed is:

1. A starter having a motor (21) and a planetary gear decelaration means (30), comprising:

a rotary shaft (28) rotated by said motor;

an output rotary member (34);

first bearing means (35) for supporting said rotary shaft;

second bearing means (36) for supporting said output rotary member, said second bearing means being disposed so as to overlap said first bearing means along a radial direction of said rotary shaft;

an overrunning clutch (37) having an engaging portion (C); and a shift lever (39) located in said engaging portion, said shift lever and said engaging portion being disposed in a space at an outer periphery of said first and second bearing means so as to at least partially overlap said first and second bearing means along said radial direction of said rotary shaft.

2. The starter as claimed in claim 1 wherein said output rotary member has a recess (34*a*) at one end thereof for accommodating one end of said rotary shaft and said first bearing means; and further comprising:

an intermediate bracket (25) having a projection portion (25*a*), said one end of said rotary member and said second bearing means being disposed in a space inside said projection portion;

said overrunning clutch including an outer clutch (38) having a projection ring (38*a*), said projection ring being disposed in a space along an outer periphery of said projection portion.

3. The starter as claimed in claim 2 further comprising:

a spur gear (29) located on said rotary shaft, said planetary gear deceleration means being engaged with said spur gear;

a support pin (32);

third bearing means (31) disposed around said support pin for supporting said support pin; and a flange (33) connected to said support pin.

4. The starter as claimed in claim 3 further comprising:

a pinion (41) fixedly secured to an inner clutch (40) of said overrunning clutch;

a roller (42) for unidirectionally coupling said inner and outer clutches; and a washer (43) and a cover (44) caulked on said outer clutch.

5. The starter as claimed in claim 4 further comprising a sleeve bearing (45) fitted to an inner periphery surface of said inner clutch, said sleeve bearing being slidably mounted on said output rotary member.

6. The starter as claimed in claim 5 further comprising a stopper (46) fitted on said output rotary member by a ring (47).

* * * * *